United States Patent [19]
Ferrand et al.

[11] Patent Number: 6,095,819
[45] Date of Patent: Aug. 1, 2000

[54] ANIMAL RIDER HARNESS ASSEMBLY

[76] Inventors: Kenneth L. Ferrand, Box 249, Greencastle, Ind. 46135; Ted A. Funke, 6643 N. County Rd., 725E, Lot F, Coatesville, Ind. 46121

[21] Appl. No.: 09/132,048

[22] Filed: Aug. 11, 1998

[51] Int. Cl.⁷ .................................................. A63B 69/04
[52] U.S. Cl. ......................................................... 434/247
[58] Field of Search ................................. 434/247, 255, 434/61, 29, 60, 62; 446/29; 472/99, 100, 133, 80

[56] References Cited

U.S. PATENT DOCUMENTS

| | | | |
|---|---|---|---|
| 847,139 | 3/1907 | Williams | 472/80 |
| 961,450 | 6/1910 | Kelly | 472/80 |
| 994,567 | 6/1911 | Berzac | 472/80 |
| 2,930,145 | 3/1960 | Green | 434/247 |
| 3,270,441 | 9/1966 | Hewes | 434/255 |
| 3,476,385 | 11/1969 | Foy | 472/80 |
| 4,737,107 | 4/1988 | Bories | 434/29 |
| 4,957,444 | 9/1990 | Armen | 434/247 |
| 4,988,300 | 1/1991 | Yamaguchi | 434/247 |
| 5,203,744 | 4/1993 | Checketts | 472/131 |
| 5,318,481 | 6/1994 | St-Germain | 472/68 |
| 5,354,238 | 10/1994 | Gaughan | 472/68 |
| 5,429,515 | 7/1995 | Greenwood | 434/247 |
| 5,492,236 | 2/1996 | Foy | 212/333 |
| 5,562,572 | 10/1996 | Carmein | 482/4 |
| 5,647,747 | 7/1997 | Macri | 434/247 |

FOREIGN PATENT DOCUMENTS

| | | | |
|---|---|---|---|
| 3614402 | 1/1989 | Germany | 472/80 |

*Primary Examiner*—Robert A. Hafer
*Assistant Examiner*—Kenneth Ferrand
*Attorney, Agent, or Firm*—Baker & Daniels

[57] ABSTRACT

A harness assembly for a human rider of an animal such as a horse. A mounting apparatus of the harness assembly is installed to an overhead support. An elongate rail, which is operatively connected with the mounting apparatus to permit rotation of the rail relative thereto, is equipped with a slider or trolley that is movable along the length of the rail. A harness that is wearable by the rider is operatively attached to the trolley via a flexible connector. The harness assembly allows a rider wearing the harness to ride a horse below the area over which the rail is rotatable, and serves to suspend the rider from the rail, and via the trolley and the flexible connector, above the area on which the horse is being ridden when the rider falls off the horse.

21 Claims, 6 Drawing Sheets

ANIMAL RIDER HARNESS ASSEMBLY

BACKGROUND OF THE INVENTION

The present invention pertains to riding accessories, and, in particular, to a harness assembly for a rider of a horse or other animal.

One inherent drawback of riding an animal such as a horse is the possibility of injury to the rider in the event the rider falls off or is thrown from that animal and crashes to the ground. This risk of injury may prevent some inexperienced riders from participating in potentially beneficial horse-riding experiences. For example, while physically or mentally challenged individuals often take pride and find great enjoyment in riding a horse, it is believed that some people may nonetheless refuse to permit such riding to occur for fear that such an individual, despite the best efforts of those assisting the rider with that ride, may fall from even a docile horse.

Even experienced riders risk falling from a horse and crashing to the ground in certain circumstances. For example, when training or "breaking" a "green" or untamed horse, an able rider who elects to saddle and then mount the saddled horse runs the risk of serious injury should the horse buck or throw off the rider before the horse grows accustomed to having the rider on its back.

One known device that attempts to address this problem employs a harness for the rider. A rope connected to the harness is routed over a pulley fixedly mounted to the roof or overhead rafter of a barn and then down to a human spotter for the rider. The spotter tries to maintain a proper tension in the rope as the rider exercises the horse such that the rider will not crash to the ground should he or she fall off the horse. While perhaps of some use, this device suffers from numerous shortcomings. For one thing, this device requires an attentive spotter and can not be operated effectively by the rider alone. In addition, the rider must stay fairly close to directly beneath the rafter mounted pulley or risk crashing into the ground when she falls because the spotter may not have been able to remove enough of the slack in the rope in the limited amount of time available.

Thus, it would be desirable to provide a device which reduces the risk of a rider crashing to the ground after falling off an animal such as a horse.

SUMMARY OF THE INVENTION

The present invention provides a harness assembly that allows a rider to be suspended from an overhead rail should the animal being ridden come out from underneath the rider, thereby reducing the likelihood of injury to the rider. The present invention utilizes a rider-wearable harness attachable to a trolley movable along an elongate rail that is rotatable around a mount installed to a support structure. The present invention allows a horse to move within a circular area while the rider remains on the horse at all times.

In one form thereof, the present invention provides a harness assembly for a human rider of an animal including a mount attachable to an overhead support, an elongate rail adapted to be arranged with its length disposed in a generally horizontal orientation, wherein the rail and the mount are operatively connected to permit rotation of the rail relative to the mount, a harness wearable by the rider, and a flexible connector operatively attached to the rail and harness and adapted to suspend the rider wearing the harness from the elongate rail.

In another form thereof, the present invention provides a harness assembly for a human rider including a rail mountable to an overhead support above an area on which an animal is to be ridden by the rider, at least one slider attached to the rail to be movable along the rail, a harness wearable by the rider, and a flexible connector operatively attached to the slider and the harness, whereby the rider when wearing the harness may be suspended from the rail via the slider and the flexible connector.

In still another form thereof, the present invention provides an equestrian harness assembly including a mounting apparatus attachable to an overhead support above an area on which a horse is to be ridden by a human rider, and a rail adapted to be arranged with its length disposed in a generally horizontal orientation and with a first end portion being operatively connected to the mounting apparatus to permit rotation of the rail relative to the mounting apparatus about a generally vertical axis. The assembly also includes at least one trolley mounted to the rail so as to be movable along at least a portion of the length of the rail, a harness wearable by the human rider, and a flexible connector operatively attached to the trolley and to the harness, wherein the flexible connector is adapted to suspend the human rider wearing the harness from the rail via the trolley and above the area on which the horse is to be ridden when the rider falls off the horse.

One advantage of the present invention is that an equestrian harness assembly is provided which allows a rider to saddle up onto a horse on a training area without fear of falling to the ground should the horse break free from the rider.

Another advantage of the present invention is that the harness assembly allows the rider to be removed from a position directly over the horse should the horse break free from the rider.

Still another advantage of the present invention is that the movable attachment of the rider-wearable harness to an overhead rail allows a horse with which the invention is being used to be lead around a path shaped otherwise than a circle of fixed diameter.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
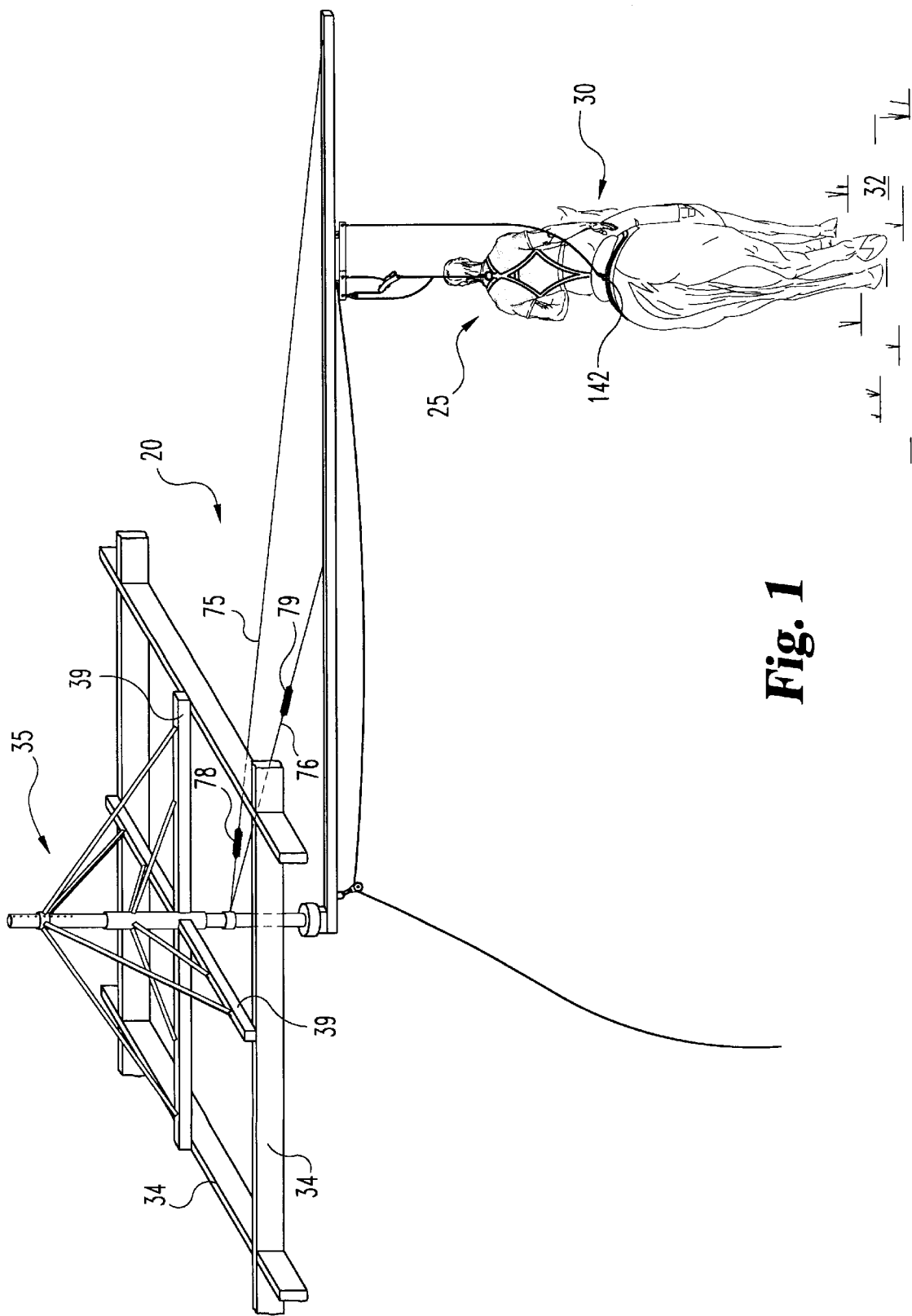
FIG. 1 is a diagrammatic perspective view of an exemplary embodiment of the harness assembly of the present invention being utilized by a rider of a horse.

Corresponding reference characters indicate corresponding parts throughout the several views. Although the drawings represent an embodiment of the present invention, the drawings are not necessarily to scale and certain features may be exaggerated or omitted in order to better illustrate and explain the present invention.

DESCRIPTION OF THE PREFERRED EMBODIMENTS

Referring now to FIG. 1, an exemplary embodiment of a harness assembly for a rider of an animal of the present invention is diagrammatically shown in a perspective view. The harness assembly, generally designated 20, is shown in an operational configuration and being used by a human rider 25 of a horse 30. Assembly 20 is installed to orthogonally configured overhead rafters shown at 34 that are part of a structure, such as a barn or an outdoor training facility, that encloses or otherwise is arranged above a riding area indicated at 32 across which horse 30 is led by rider 25.

Figure 2:
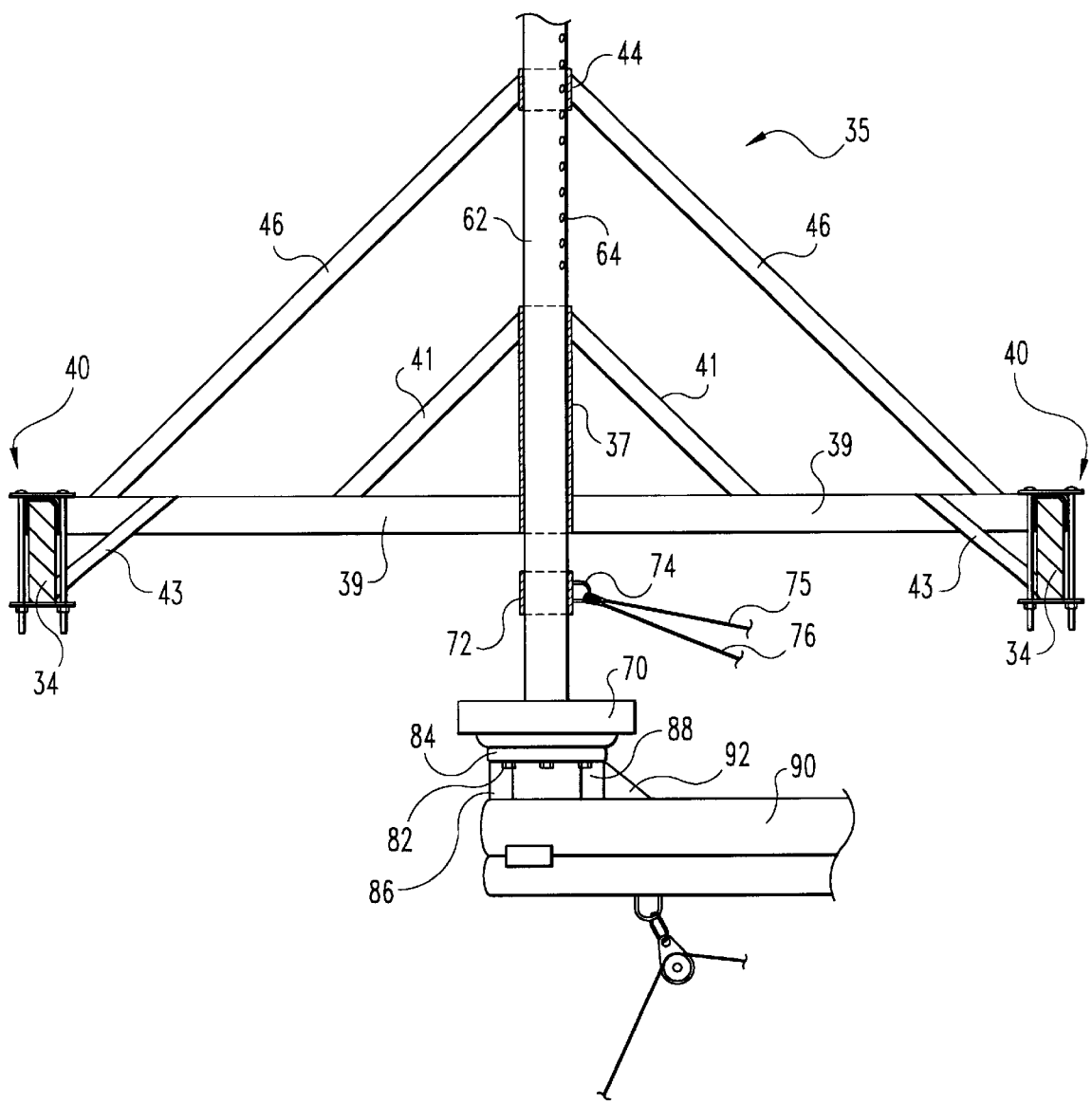
FIG. 2 is a fragmentary front view in partial cross section of the harness assembly of FIG. 1 further illustrating the mounting apparatus of the assembly.
Figure 3:
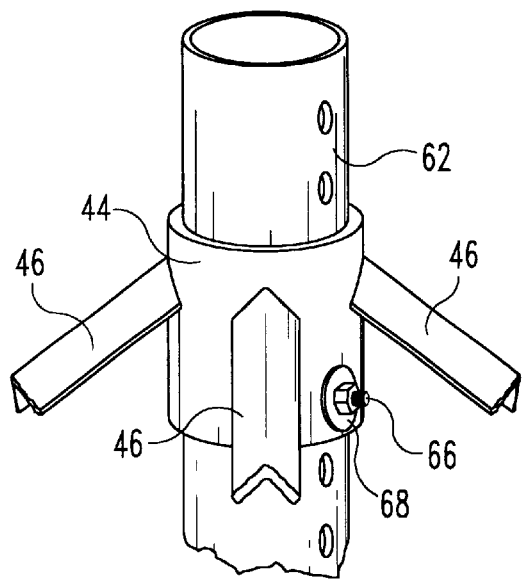
FIG. 3 is a fragmentary front view of the annular collar of the mounting apparatus of FIG. 2 which may be utilized to adjust the height of the rail of the harness assembly.
Figure 4:
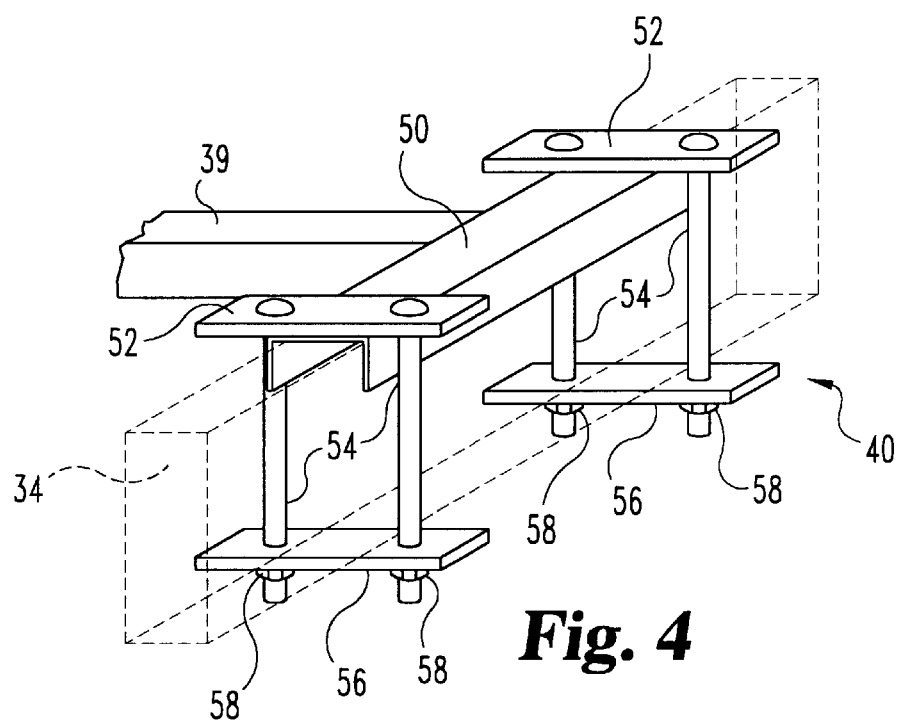
FIG. 4 is a perspective view of one clamping assembly of the mounting apparatus of FIG. 2, wherein a rafter to which the assembly is secured is abstractly shown in shadow.

With additional reference to FIGS. 2–4, the portion of harness assembly 20 adapted for installation to the illustrated configuration of overhead rafters 34 is shown in further detail. The mounting apparatus, generally designated 35, includes a rigid vertical tube 37 that is centrally located within the opening between the orthogonally configured rafters 34 to which apparatus 35 is installed. In the shown embodiment, tube 37 is made of steel and comprises an inside diameter of approximately four inches. Four beams 39 are horizontally disposed and arranged at 90° intervals around central tube 37 and are each rigidly secured, such as by welding, to tube 37. One suitable construction of beam 39 comprises a six inch steel channel member having the base of the channel being positioned horizontally and with the channel forming flanges at each end of the base flange pointing downwardly. Four bars 41, each of which is associated with a different beam 39, are utilized to brace central tube 37 relative to the four beams 39. Each bar 41 is rigidly secured, such as by welding, at one end to the upper region of central tube 37 and at the other end to a middle length segment of its respective beam 39. A suitable construction for bar 41 is a one and one-half inch steel angle iron. Although not shown in the Figures, ropes or wire cables may be looped under bars 41 and attached to the peak of the rafters or the roof (not shown) to provide a further suspending force to mounting apparatus 35 such that rafters 34 to which beams 39 are clamped do not bear all of the load.

With additional reference to FIG. 3, a rigid annular collar 44 is disposed directly above and in alignment with central tube 37. The internal circular opening of collar 44 has a diameter equal to that of the hollow of central tube 37, which is a four inch diameter in the exemplary embodiment shown. Collar 44 is rigidly secured to the four beams 39 via four support bars 46 spaced at even intervals around the circumference of collar 44. Each support bar 46 is rigidly secured, such as by welding, at its upper end to collar 44 and at its lower end to an end length segment of its respective beam 39. Bars 46 are constructed from the same material as used for bars 41, such as a one and one-half inch steel angle iron.

At the outward end of each beam 39, a clamping assembly, generally designated 40, is provided in order to permit a positive securement of mounting apparatus 35 to the rafters. The shown clamping assembly is merely illustrative of one suitable type of equipment for installing the exemplary mounting apparatus 35 to support rafters 34. Differently configured clamps or fastening equipment may be naturally employed with the shown rafters, as well as with differently configured support structures that may be encountered in the field. With additional reference to FIG. 4, which is a fragmentary perspective view of one such clamping assembly that is representative of the clamping assemblies located at the outer ends of the four beams 39, clamping assembly 40 includes a channel member 50 that is fixedly secured, such as by welding, to beam 39 in a transverse orientation relative thereto. Channel member 50 is sized such that the rafter 34 shown in dashed lines snugly nests therein. A pair of plates 52 fixedly secured, such as by welding, to opposite ends of channel member 50 include holes through which are inserted hex-headed bolts 54 that downwardly extend parallel to the opposite sides of the rafter 34. The insertion ends of bolts 54 fit through holes provided in a pair of clamping plates 56. Nuts 58 screwed onto bolts 54 permit clamping plates 56 to be tightened up against the underside of rafter 34 to thereby attach the clamping assembly 40, and thereby mounting apparatus 35, to the overhead rafters. As shown in FIG. 2, an additional brace 43 rigidly secured to each beam 39 may be arranged to abut the inward face of rafter 34 to further prevent twisting of mounting apparatus 35 relative to the rafters.

Referring again to FIG. 2, axially extending through central tube 37 and collar 44 is a vertically oriented cylindrical axle 62. A series of holes 64 vertically spaced along the upper length of axle 62 transversely extend therethrough. As shown in FIG. 4, axle 62 is axially captured within collar 44 via a bolt 66 that inserts within diametrically aligned holes in collar 44 and through axle 62. Bolt 66 is retained therein by a washer and nut combination shown at 68 that prevents an inadvertent removal of axle 62 from the rest of mounting apparatus 35. The axial positioning of axle 62 within tube 37 and annular collar 44, and therefore the height of the rail above the training area 32 as described further below, may be adjusted by changing the hole 64 through which bolt 66 is selected to extend.

Axle 62 protrudes below the bottom of tube 37, and to the bottom portion of axle 62 is rotatably mounted a hub abstractly shown at 70. In the shown embodiment, axle 62 and hub 70 are formed from a typical automobile hub and axle assembly, but otherwise configured components that permit relative rotation may be substituted within the scope of the invention. Circumferentially mounted on axle 62 above hub 70 is an annular collar 72 which is rotatable around and axially fixed on axle 62. Eyelet 74 is welded on the radial periphery of collar 72 and serves as the connection point for three-eighths inch coated wire cables 75 and 76 that are connected in a weight supporting fashion to the rail described below. As abstractly shown in FIG. 1, turnbuckles 78 and 79 respectively permit the tension in cables 75 and 76 to be adjusted by an installer of harness assembly 20.

Attached to the underside of hub 70 with a multitude of fasteners shown at 82 is a steel, ring-shaped mounting flange 84 to which is rigidly attached, such as by welding, a pair of downwardly projecting spacers 86, 88 formed of steel angle irons. The lower ends of spacers 86, 88 are fixedly secured by welding to a generally horizontally extending steel pipe 90 that forms the upper portion of the rail to which the rider's harness is movably connected as described below. Gusset 92 is welded to spacer 88 and pipe 90 for reinforcement.

It will be recognized by the skilled artisan that the particular configuration of mounting apparatus 35 shown and described herein is merely illustrative and is not intended to limit of the scope of the invention. Alternately configured mounting assemblies may be utilized in order to mount the rail as described below to the same or different overhead structures. For example, axle 62 possibly could be directly fastened to an overhead truss or the like. In addition, it is within the scope of the invention to provide a ground-based support or post to which the rail may be operatively attached.

Figure 5:
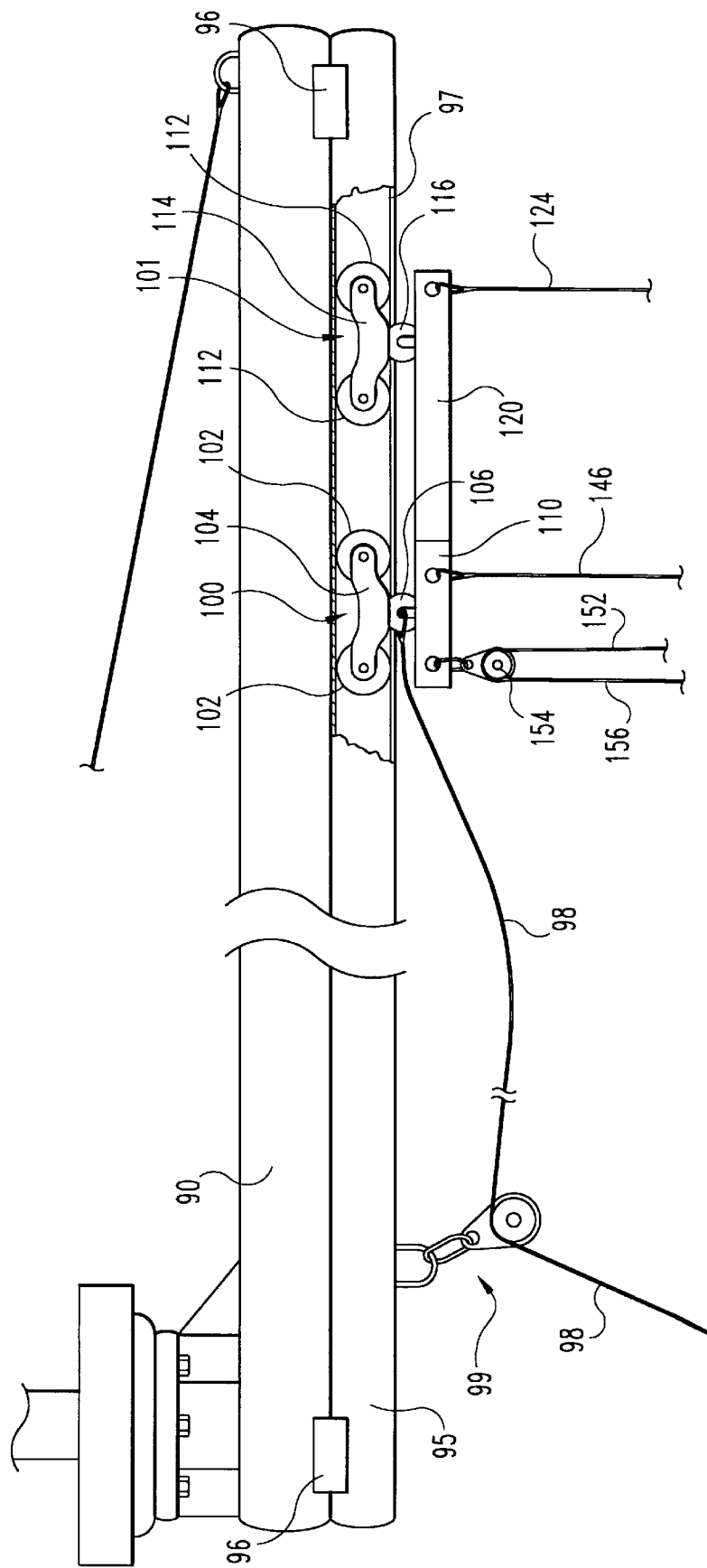
FIG. 5 is a fragmentary front view, with a portion removed to reveal the rail interior, of the harness assembly of FIG. 1 which further illustrates the rotatable rail and the components permitting a movable attachment of the harness to the rail of the assembly.

Referring now to FIG. 5, the rail which is rotatably attached to mounting apparatus 35 is further shown in a fragmentary view and with a portion of its lower pipe removed. In the shown embodiment, the rail comprises upper pipe 90 and an equal length lower pipe 95. Pipes 90 and 95 are permanently secured together via a series of plates 96 welded at even intervals along the pipe lengths and on both sides of the pipes. In the shown embodiment, the elongate rail comprises a straight configuration, and is generally horizontally arranged above ground 32. In alternate embodiments, the rail may be curved or arcuate, and further need not be exactly horizontally disposed to function properly within the scope of invention.

In the shown embodiment, lower pipe 95 is about 14 feet long and includes a two and three-eighths inch outside diameter and a pipe wall thickness of about five-sixteenths inch. A slot 97, which has a uniform width of about three-eighths inch, is formed in the downward facing portion of lower pipe 95 and extends along the entire axial length of pipe 95. Each of the pipe ends are effectively capped by securing a bolt through the pipe to prevent the trolleys from exiting the pipe.

Installed within the hollow interior of pipe 95 are a pair of sliders, generally shown at 100 and 101, that allow for the movement of articles attached thereto along the length of the overhead rail. Sliders 100 and 101 are each movable independent of the other. The term slider is used broadly herein in reference to the overall movability of a device along the rail, and is specifically intended to encompass the wheeled devices or trolleys shown as well as devices that have surfaces in sliding engagement with the rail. Slider 100 includes a pair of rotatable wheels 102 that roll along the interior bottom surface of pipe 95 and which are connected by frame 104. A flange 106 downwardly extending from frame 104 extends through pipe slot 97, and bar 110 is fixedly attached, such as by welding, to the lower region of flange 106. Slider 101 similarly includes wheels 112, frame 114, flange 116 and bar 120. Sliders of this design may be fashioned using door hangers available from Cannon Ball: HNP, a division of National Material Limited Partnership, of Beloit, Wis. Bar 110 and bar 120 are designed with facing ends that abut each other when brought together to prevent the radially outward wheel 102 of slider 100 from rubbing against and binding the radially inward wheel 112 of slider 101.

To permit slider 100 to be selectively moved toward a position below mounting apparatus 35, a flexible cable or rope 98 is tied or otherwise attached to slider flange 106 and is routed to and over pulley assembly 99. Pulley assembly 99 is fixedly attached to and suspended below rail pipe 95. The end of rope 98 hanging down below pulley assembly 99 can be grasped by a spotter who can pull on it to cause slider 100, and thereby a harness wearing rider operatively connected to slider 100 as described further below, away from the outward end of rail 95. In a not shown alternate embodiment, rope 98 may be connected to a powered, remotely controllable, rail-mounted winch capable of reeling in rope 98 to cause slider 100 to be moved along rail 95. The rider using the harness assembly may carry the remote control for such winch to allow self-control of his or her movement along rail 95.

The shown configuration of the rail and sliders is just one of the many different configurations a skilled artisan will recognize as suitable for use in harness assembly 20. For example, a single, more sturdy pipe may be substituted for the two pipe rail configuration shown. Moreover, and possibly with complementary changes to the slider configuration, the rail or track can be formed with a different cross-sectional shape, such as with an I-beam type design. In addition, the sliders employed may be design to slidingly, as opposed to rollingly, engage the rail, and further may be configured to be differently positioned with respect to, such as slung below, the rail.

Figure 6:
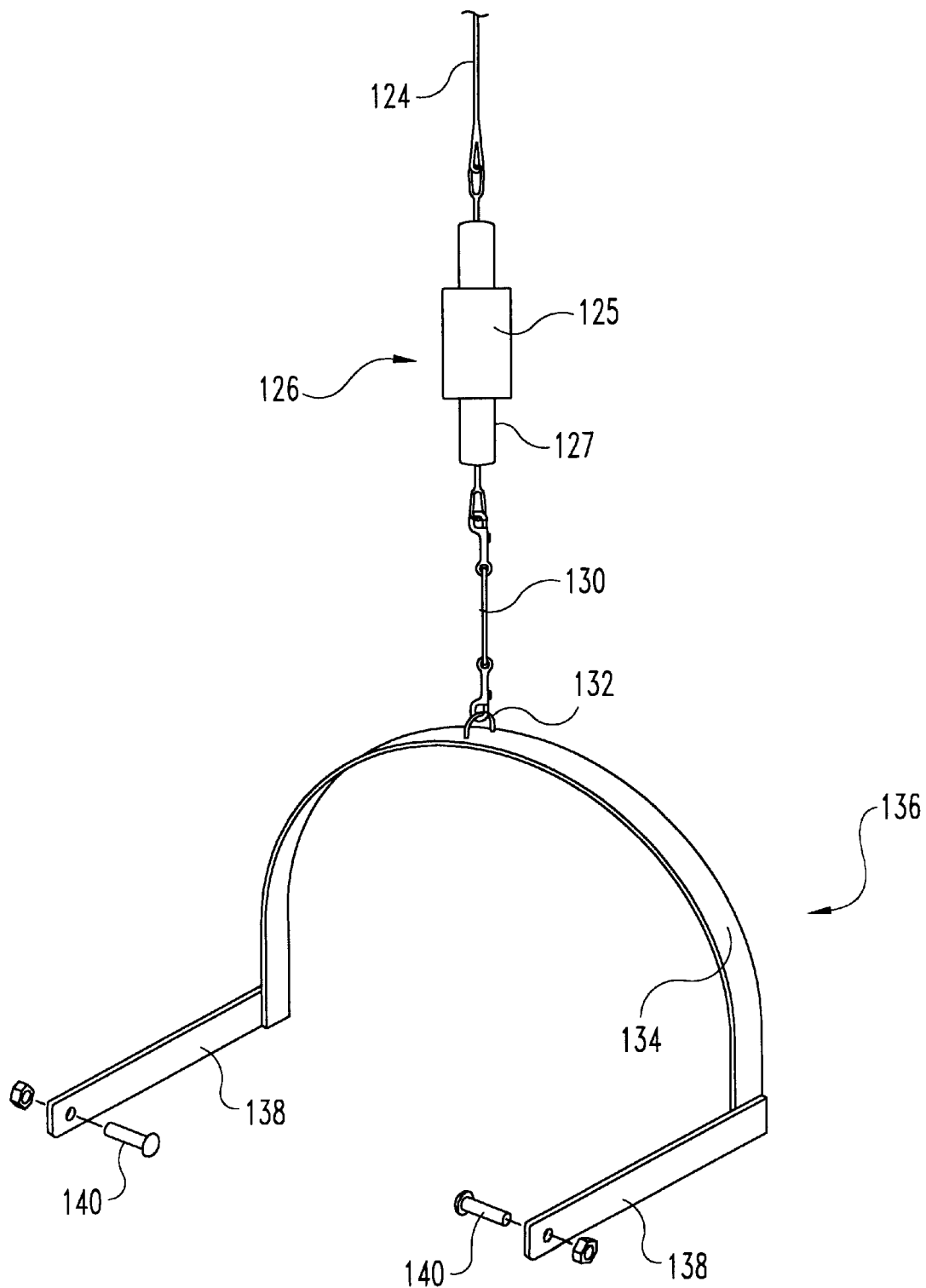
FIG. 6 is a fragmentary perspective view of the harness assembly of FIG. 1 further illustrating the coupling assembly to the saddle of the animal to be ridden.

Referring now to FIG. 6, the components of harness assembly 20 utilized for the detachable coupling to the saddle of the animal being ridden is diagrammatically shown in a perspective view. A rope or other type of flexible connector 124 is connected at its lower end to the female portion 125 of a quick release apparatus indicated generally at 126. The upper end of connector 124 is attached to bar 120 of slider 101, and slider 101 allows the coupling assembly shown in FIG. 6 to move along the length of rail pipe 95. Rope 124, which is shown as formed from a single piece but may be formed from a series of connected segments of different types of materials, includes an elastic construction such as provided in bungee cords and the like. This elastic construction permits the cable length to vary to absorb sudden increases in tensions on the rope which could otherwise jerk the overhead rail 95 as it rotates beneath mounting apparatus 35 during use of harness assembly 20.

The male portion 127 of quick release apparatus 126, which is releaseably held within female portion 125, is connected via a fitting 130 to an eyelet 132 rigidly secured to steel bar 134 of the saddle attachable yoke 136. Fitting 130 is provided with latches on either end to allow its ready connection to and disconnection from either or both of male portion 127 and eyelet 132 to facilitate connection of cable 124 to yoke 136. Quick release apparatus 126 is designed to disconnect, or in other words to have male portion 127 be released from within female portion 125, when a tensile force of sufficient magnitude is applied on quick release apparatus 126. In particular, to reduce the possibility of damage to harness assembly 20 or injury to the animal, quick release apparatus 126 is preferably selected so as to disconnect when an animal to which yoke 136 is attached via the saddle bolts from the area generally underneath harness assembly 20.

Yoke 136 includes a pair of flat bars 138 that project forward from the ends of arcuate bar 134. Bar 134 is curved so as to generally conform to the shape of the back of an animal being ridden. Each bar 138 includes a hole therein for fasteners 140, such as the bolts and nuts shown, that are extendable through the saddle of the animal being ridden to mount yoke 136 to such saddle 142 as shown in FIG. 1.

Figure 7:
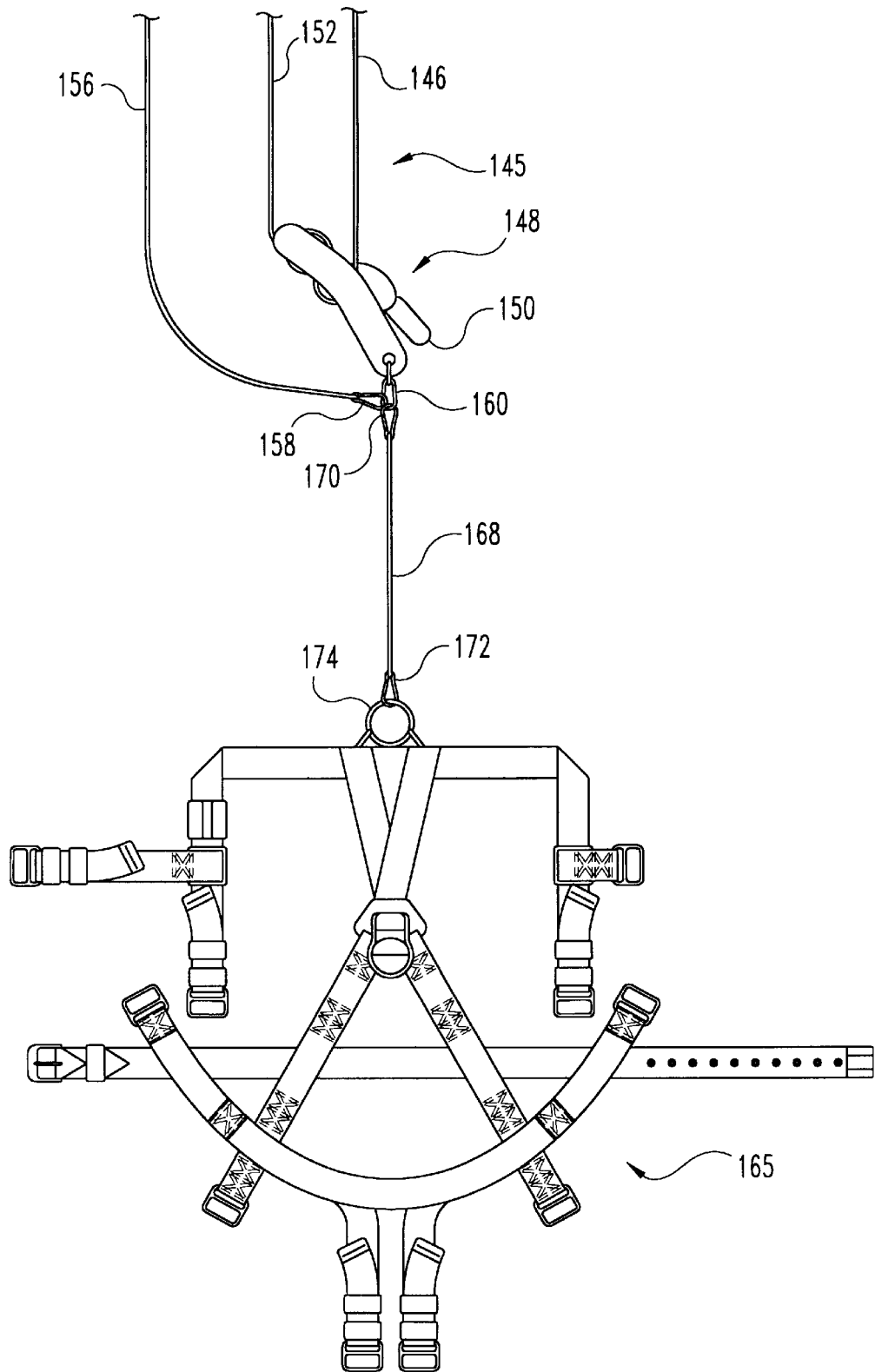
FIG. 7 is a fragmentary front view of the harness assembly of FIG. 1 further illustrating the rider-wearable harness and the rigging for attachment to the rail-mounted trolley.

Referring now to FIGS. 5 and 7, the parts of harness assembly 20 employed to suspend a rider from the overhead rail of the assembly is diagrammatically shown. An end of a flexible rope generally indicated at 145 is attached to bar 110 of slider 100 that allows a harness-wearing rider to move along the length of rail pipe 95. Segment 146 of rope 145 extends from slider bar 110 down to and is threaded through a rope locking device, generally designated 148, including handle 150. One suitable locking device is known as a self-braking single rope descender and is available from Petzl and made in France. Segment 152 of rope 145 extends upward from locking device 148 and over a pulley 154 suspended from bar 110, and segment 156 of rope 145 hangs below pulley 154. In this embodiment, rope 145 is a continuous piece but may be formed from a series of connected segments if desired. The freely hanging end of rope 145 is equipped with a hook or latching hook indicated at 158 to allow rope 145 to be fastened to ring 160 attached to locking device 148.

A harness which can be strapped on and worn by a human rider is generally indicated at 165. The shown harness 165, which is available from Dalloz Fall Protection of Franklin, Pa. as the Versalite 650 Series harness, is merely illustrative as other harness designs wearable by a rider and capable of suspending that rider may be employed within the scope of the present invention. A rope or other flexible connector 168 includes latching hooks 170 and 172 at opposite ends. By connecting hook 170 to ring 160, and by connecting hook 172 to ring 174 of harness 165, the harness 165 is suspended from locking device 148.

Locking device 148 is configured so as to lock or grip rope 145 to prevent the length of rope segment 146, and thereby the distance below the rail at which the wearer of harness 165 will be suspended, from changing. In order for a rider to change the length of rope segment 146, while depressing handle 150, the rider pulls down on rope segment 156 to effectively shorten rope segment 146, or pulls down on locking device 148 while allowing segment 156 to be drawn upward to lengthen rope segment 146. The subsequent release of handle 150 will cause locking device 148 to again lock rope 145 to prevent further rope length changes.

The structure for harness assembly 20 will be further understood in view of the following explanation of one form of its use in the riding of a horse 30 as shown in FIG. 1. Once mounting apparatus 35 is installed to an overhead structure such that rail 95 is rotatable relative thereto and over training area 32, a person may put on harness 165 and eventually mount a horse 30 outfitted with a saddle 142 to which has been fastened yoke 136. Prior to mounting the horse, the various rigging parts described above used to releaseably attach yoke 136 to the overhead rail are preferably all interconnected but not yet attached to yoke 136. After the soon-to-be rider moves, or the rail is manually rotated by pulling on rope segment 146, such that the rider is generally below the rail-mounted trolley 100, harness 165 is connected to locking device 148 via the latching hooks of connector 168. The harness may alternatively be operatively attached to locking device 148 after the rider has mounted the horse. After the rider then mounts the horse that is also generally below the trolley 100, and via manipulation of locking device 148, the rider then adjusts rope segment 146 as described above to such a length that the rider would be suspended from the rail 95, and would not crash to ground 32, should he or she fall off horse 30. After this adjustment is complete, hook 158 is attached to ring 160 to keep rope segment 156 out of the way.

The rider next grasps fitting 130, which as described above is already attached to connector 124 via quick release apparatus 126, and pulls it downward against the returning force provided by the elastic construction of connector 124. Fitting 130 is manuevered so as to be latched to eyelet 132 of yoke assembly 136.

The rider is now fully connected to harness assembly 20 and is prepared to exercise horse 30. As the rider proceeds to lead horse 30 around ground 32, the connection provided between yoke 136 and slider 101 is sufficiently taut so as to cause overhead rail 95 to be moved as needed in concert with horse 30. In particular, while trolley 101 moves freely along the length of rail 95 as the horse moves either toward or away from the center of the training area over which mounting apparatus 35 is disposed, rail 95 is free to rotate around a generally vertical axis aligned through axle 62 as the horse moves in a direction transverse to the direction in which rail 95 extends. It will be appreciated that because the connection between slider 101 and yoke 136, and not the connection between slider 100 and harness 165, is used to pull the rail behind the horse, the rider need not be subjected to a constant tugging on his or her harness. Moreover, horse 30 need not be ridden in a circular path having a fixed diameter, but instead, the movement of the trolleys along rail 95 allows the horse to be ridden almost anywhere within the circular area over which the overhead rail is movable.

In the event rider 25 simply falls off horse 30 or horse 30 bolts from training area 32, the rider is suspended from rail 95 via the connection between slider 100 and harness 165. When a rider is so suspended, by having a spotter pull on rope 98 or by remotely controlling the winch that reels in rope 98 in an alternate embodiment, the rider may be moved to a location clear of the horse. In the event that horse 30 tries to bolt from training area 32, quick release apparatus 126 disengages to allow the horse to break free from harness assembly 20 without damage thereto.

While this invention has been shown and described as having multiple designs, the present invention may be further modified within the spirit and scope of this disclosure. For example, the overhead rail need not be rotatably mounted but could be a fixed track to which sliders 100 and 101 are installed. This application is therefore intended to cover any variations, uses, or adaptations of the invention using its general principles. Further, this application is intended to cover such departures from the present disclosure as come within known or customary practice in the art to which this invention pertains.

What is claimed is:

1. A harness assembly for a human rider of an animal comprising:

a mount attachable to an overhead support;

an elongate rail having a length extending between a first end portion and a second end portion, said elongate rail adapted to be arranged with said length disposed in a generally horizontal orientation, said rail and said mount being operatively connected to permit rotation of said rail relative to said mount;

at least one slider attached to said rail to be movable along at least a first segment of said length of said rail;

a harness wearable by the rider;

a first flexible connector operatively attached to said at least one slider and said harness, said first flexible connector adapted to suspend the rider wearing said harness from said elongate rail, whereby the movability of said at least one slider along said first length segment of said rail permits said harness to be moveable below said first length segment of said rail without altering a length of said first flexible connector; and a second flexible connector operatively attached to said at least one slider and operatively attachable to the animal.

2. The harness assembly of claim 1 wherein said elongate rail comprises a generally straight tube with an axially extending slit, wherein said at least one slider comprises a trolley with a depending attachment member to which said first flexible connector attaches, and wherein said trolley is disposed within said tube with said attachment member extending through said slit and beyond a radial periphery of said tube.

3. The harness assembly of claim 1 further comprising a module attachable to a saddle, and a quick release assembly operatively attached to said module, said second flexible connector operatively attached to said quick release assembly, said quick release assembly configured to disconnect said module from said second flexible connector upon application of sufficient tensile force on said quick release assembly.

4. The harness assembly of claim 3 wherein said module comprises a yoke and said second flexible connector comprises an elastic construction.

5. The harness assembly of claim 1 further comprising a pulley and a rope, said pulley installed to said rail proximate said mount, and wherein a first end of said rope is attached to said at least one slider and a second end of said rope is routed over said pulley, whereby an application of a pulling force on said second end of said rope causes said at least one slider to move along said rail toward said pulley.

6. The harness assembly of claim 1 wherein said mount comprises an axle and a hub rotatable relative to said axle, wherein one of said axle and said hub is fixedly secured to said rail, and wherein said mount further comprises a framework for fixedly installing the other of said axle and said hub to the overhead support.

7. The harness assembly of claim 6 wherein said hub is fixedly secured to said rail, wherein said framework comprises a tube connected to a plurality of beams securable to rafters of the overhead support, and said axle being axially received through said tube.

8. The harness assembly of claim 7 wherein said framework further comprises an adjustment collar through which said axle extends, said collar connected by at least two support bars to said plurality of beams, wherein said collar comprises a hole through which a bolt is insertable into one of a plurality of axially spaced holes in said axle to prevent rotation of said axle relative to said framework and to allow for an adjustment in the axial positioning of said axle within said tube.

9. The harness assembly of claim 1 further comprising means for changing a length of said first flexible connector to adjust a distance that said harness is suspended below said rail.

10. A harness assembly for a human rider comprising:
a rail mountable to an overhead support above an area on which an animal is to be ridden by the rider;
at least one slider attached to said rail to be movable along said rail;
a harness wearable by the rider; and
a first flexible connector operatively attached to said at least one slider and said harness, whereby the rider when wearing said harness may be suspended from said rail via said at least one slider and said first flexible connector;
a module attachable to a saddle;
a quick release assembly operatively attached to said module;
a second flexible connector operatively attached to said quick release assembly and said at least one slider; and
wherein said quick release assembly is configured to disconnect said module from said second flexible connector upon application of sufficient tensile force on said quick release assembly.

11. The harness assembly of claim 10 wherein said module comprises a yoke with a downwardly bowed base and a pair of bars projecting from opposite ends of said base, each of said bars adapted to accommodate a fastener insertable through a saddle.

12. The harness assembly of claim 10 wherein said rail comprises a tube with a slit extending along a length of said tube, wherein said at least one slider comprises a trolley with a depending attachment member to which said first flexible connector attaches, and wherein said trolley is disposed within said tube with said attachment member extending through said slit and beyond a radial periphery of said tube.

13. The harness assembly of claim 10 further comprising means for changing a length of said first flexible connector to adjust a distance that said harness is suspended below said rail.

14. The harness assembly of claim 10 further comprising a mount attachable to the overhead support, and wherein said rail and said mount are operatively connected to permit rotation of said rail relative to said mount and about a generally vertical axis.

15. An equestrian harness assembly comprising:
a mounting apparatus attachable to an overhead support above an area on which a horse is to be ridden by a human rider;
an elongate rail having a length extending between a first end portion and a second end portion, said elongate rail adapted to be arranged with said length disposed in a generally horizontal orientation, said first end portion of said rail and said mounting apparatus being operatively connected to permit rotation of said rail relative to said mounting apparatus and about a generally vertical axis;
at least one trolley mounted to said rail so as to be movable along at least a portion of the length of said rail, said at least one trolley comprising a first trolley and a second trolley movable separate from said first trolley;
a harness wearable by the human rider;
a first flexible connector operatively attached to said first trolley and to said harness, said first flexible connector adapted to suspend the human rider wearing said harness from said rail via said first trolley and above the area on which the horse is to be ridden when the rider falls off the horse; and
a second flexible connector operatively attached to said second trolley and having a lower end operatively attachable to a saddle on the horse whereby said second flexible connector is adapted to allow the horse to pull the rail behind the horse.

16. The equestrian harness assembly of claim 15 further comprising a yoke attachable to a saddle, and a quick release assembly operatively attached to said yoke and to said lower end of said second flexible connector whereby said second flexible connector is attachable to the saddle on the horse via said quick release assembly and said yoke, said quick release assembly configured to disconnect said yoke from said second flexible connector upon application of sufficient tensile force on said quick release assembly.

17. A harness assembly for a human rider of an animal comprising:
a mount attachable to an overhead support;
an elongate rail having a length extending between a first end portion and a second end portion, said elongate rail adapted to be arranged with said length disposed in a generally horizontal orientation, said rail and said mount being operatively connected to permit rotation of said rail relative to said mount;
a harness wearable by the rider;
a flexible connector operatively attached to said rail and said harness, said flexible connector adapted to suspend the rider wearing said harness from said elongate rail;

at least one slider attached to said rail to be movable along at least a first segment of said length of said rail, and wherein said flexible connector is attached to said rail via said at least one slider, whereby the movability of said at least one slider along said first length segment of said rail permits said harness to be moveable below said first length segment of said rail without altering a length of said flexible connector;

a module attachable to a saddle;

a quick release assembly operatively attached to said module;

a second flexible connector operatively attached to said quick release assembly and said at least one slider; and said quick release assembly configured to disconnect said module from said second flexible connector upon application of sufficient tensile force on said quick release assembly.

18. The harness assembly of claim 17 wherein said module comprises a yoke and said second flexible connector comprises an elastic construction.

19. A harness assembly for a human rider of an animal comprising:

a mount attachable to an overhead support;

an elongate rail having a length extending between a first end portion and a second end portion, said elongate rail adapted to be arranged with said length disposed in a generally horizontal orientation, said rail and said mount being operatively connected to permit rotation of said rail relative to said mount;

a harness wearable by the rider;

a flexible connector operatively attached to said rail and said harness, said flexible connector adapted to suspend the rider wearing said harness from said elongate rail;

wherein said mount comprises an axle and a hub rotatable relative to said axle, wherein said hub is fixedly secured to said rail, and wherein said mount further comprises a framework for fixedly installing said axle to the overhead support, said framework comprising a tube connected to a plurality of beams securable to rafters of the overhead support, and said axle being axially received through said tube, wherein said framework further comprises an adjustment collar through which said axle extends, said collar connected by at least two support bars to said plurality of beams, wherein said collar comprises a hole through which a bolt is insertable into one of a plurality of axially spaced holes in said axle to prevent rotation of said axle relative to said framework and to allow for an adjustment in the axial positioning of said axle within said tube.

20. An equestrian harness assembly comprising:

a mounting apparatus attachable to an overhead support above an area on which a horse is to be ridden by a human rider;

an elongate rail having a length extending between a first end portion and a second end portion, said elongate rail adapted to be arranged with said length disposed in a generally horizontal orientation, said first end portion of said rail and said mounting apparatus being operatively connected to permit rotation of said rail relative to said mounting apparatus and about a generally vertical axis;

at least one trolley mounted to said rail so as to be movable along at least a portion of the length of said rail;

a harness wearable by the human rider;

a flexible connector operatively attached to said at least one trolley and to said harness, said flexible connector adapted to suspend the human rider wearing said harness from said rail via said at least one trolley and above the area on which the horse is to be ridden when the rider falls off the horse;

a yoke attachable to a saddle;

a quick release assembly operatively attached to said yoke;

a second flexible connector operatively attached to said quick release assembly and said at least one trolley; and said quick release assembly configured to disconnect said yoke from said second flexible connector upon application of sufficient tensile force on said quick release assembly.

21. The equestrian harness assembly of claim 20 wherein said at least one trolley comprises a first trolley and a second trolley movable separate from said first trolley, wherein said flexible connector is operatively attached to said first trolley, and wherein said second flexible connector is operatively attached to said second trolley.

* * * * *